United States Patent
Jones et al.

(10) Patent No.: US 11,033,997 B1
(45) Date of Patent: Jun. 15, 2021

(54) METHOD FOR PRECISE CONTROL OF MANUFACTURE OF NON-RIGID THIN-WALLED TUBE PRODUCTS

(71) Applicant: The United States of America as Represented by the Secretary of the Navy, Indian Head, MD (US)

(72) Inventors: Tina Jones, LaPlata, MD (US); John Kelley, Owings Mills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/602,376

(22) Filed: Sep. 26, 2019

(51) Int. Cl.
| | |
|---|---|
| *B24B 5/00* | (2006.01) |
| *B23Q 1/00* | (2006.01) |
| *B29B 13/00* | (2006.01) |
| *F02K 9/00* | (2006.01) |
| *B24B 5/04* | (2006.01) |
| *B23Q 1/76* | (2006.01) |
| *F02K 9/24* | (2006.01) |
| *B29B 13/02* | (2006.01) |
| *B24B 1/00* | (2006.01) |

(52) U.S. Cl.
CPC .............. *B24B 5/047* (2013.01); *B23Q 1/763* (2013.01); *B29B 13/024* (2013.01); *F02K 9/24* (2013.01); *B24B 1/00* (2013.01)

(58) Field of Classification Search
None
See application file for complete search history.

(56) References Cited

U.S. PATENT DOCUMENTS

| | | | | |
|---|---|---|---|---|
| 4,535,661 A | * | 8/1985 | Berbalk | B23Q 1/265 384/255 |
| 8,128,292 B2 | * | 3/2012 | Landwehr | F16C 19/507 384/549 |
| 8,647,176 B2 | * | 2/2014 | Schmitz | B24B 5/01 451/63 |

OTHER PUBLICATIONS https://www.google.com/search?q=lathe+steady+rest&source=lnms&tbm=isch&sa=X&ved=0ahUKEwjU1cj8yoHhAhUDVt8KHTM6DcwQ AUIDygC&biw=1600&bih=708#imgrc=mdHW14bn11ofTM:&spf=1552767566816.
https://www.bing.com/images/search?view=detailV2&id=16B96599BC30E29D785B22215FC68ACB525DF7D1&thid=OIP.T2yoKHSgc_ODC_MXqjUa-gHaHa&mediaurl=https%3A%2F%2Fwww.ptreeusa.com%2Fimages%2F7365_wheel_1_300.jpg&exph=300&expw=300&q=scroll+gear%2c+scroll+plate%2c+lathe%2c+wheels%2c +lathe&selectedindex=65&ajaxhist=0&vt=0&eim=1,2,6.
https://www.youtube.com/watch?v=WKCl3lfAx1Q.

* cited by examiner

*Primary Examiner* — Jacob T Minskey
*Assistant Examiner* — Matthew Hoover
(74) *Attorney, Agent, or Firm* — Fredric J. Zimmerman

(57) ABSTRACT

A method for correcting non-rigid thin-walled tubular elements having geometric deficiencies, wherein, following correction, the tubular elements may perform over a wide range of pressure and temperatures, for example as a rocket motor beaker, from about −70 C to about 1000 C. Correction is required to remove asperities, maximize cylindricity, squaring a forward end wall and a rearward end wall, so that the forward end wall of the tube product may be fitted, bonded and sealed to a circular planar element using a labyrinth-joint closure. The method provides uniformity so that both the tubular elements and the circular planar elements are interchangeably uniform in size, shape and per- (Continued)

formance, and may be readily assembled into non-rigid thin-walled tube products.

11 Claims, 10 Drawing Sheets

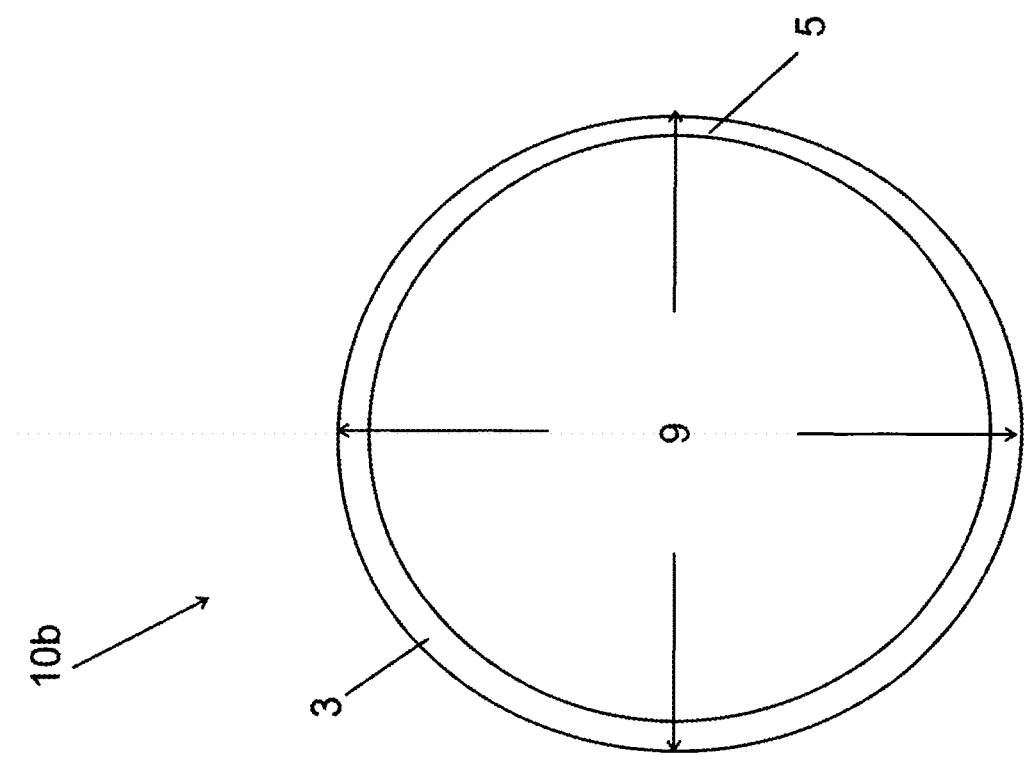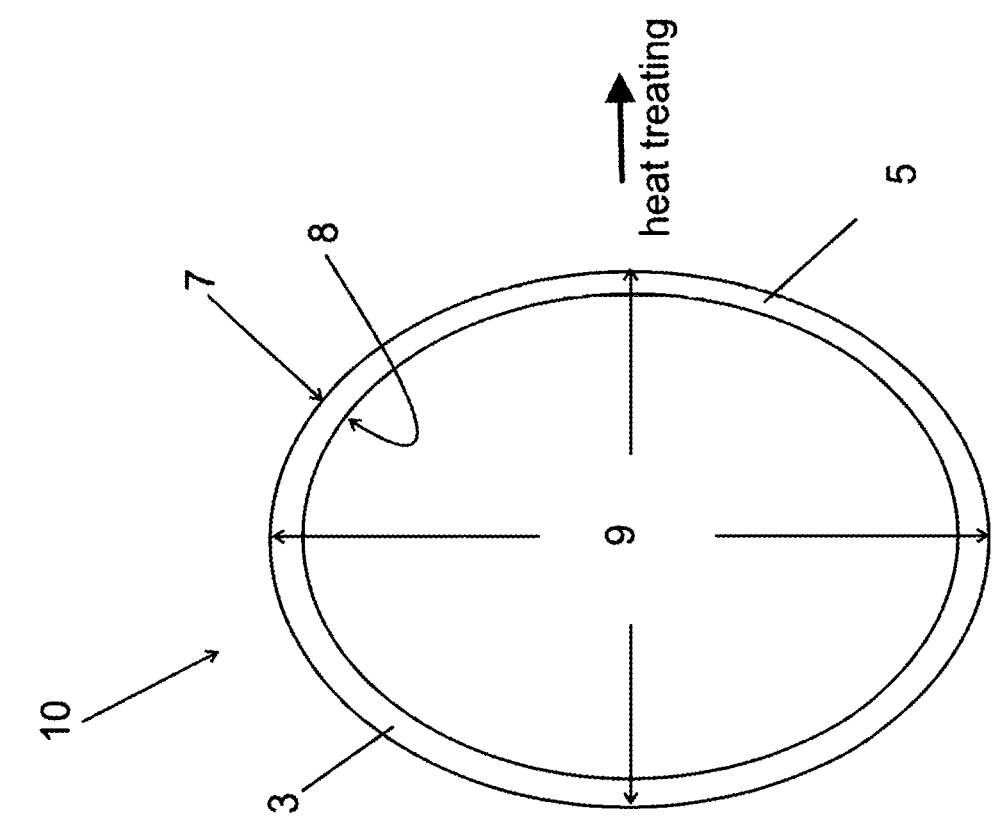

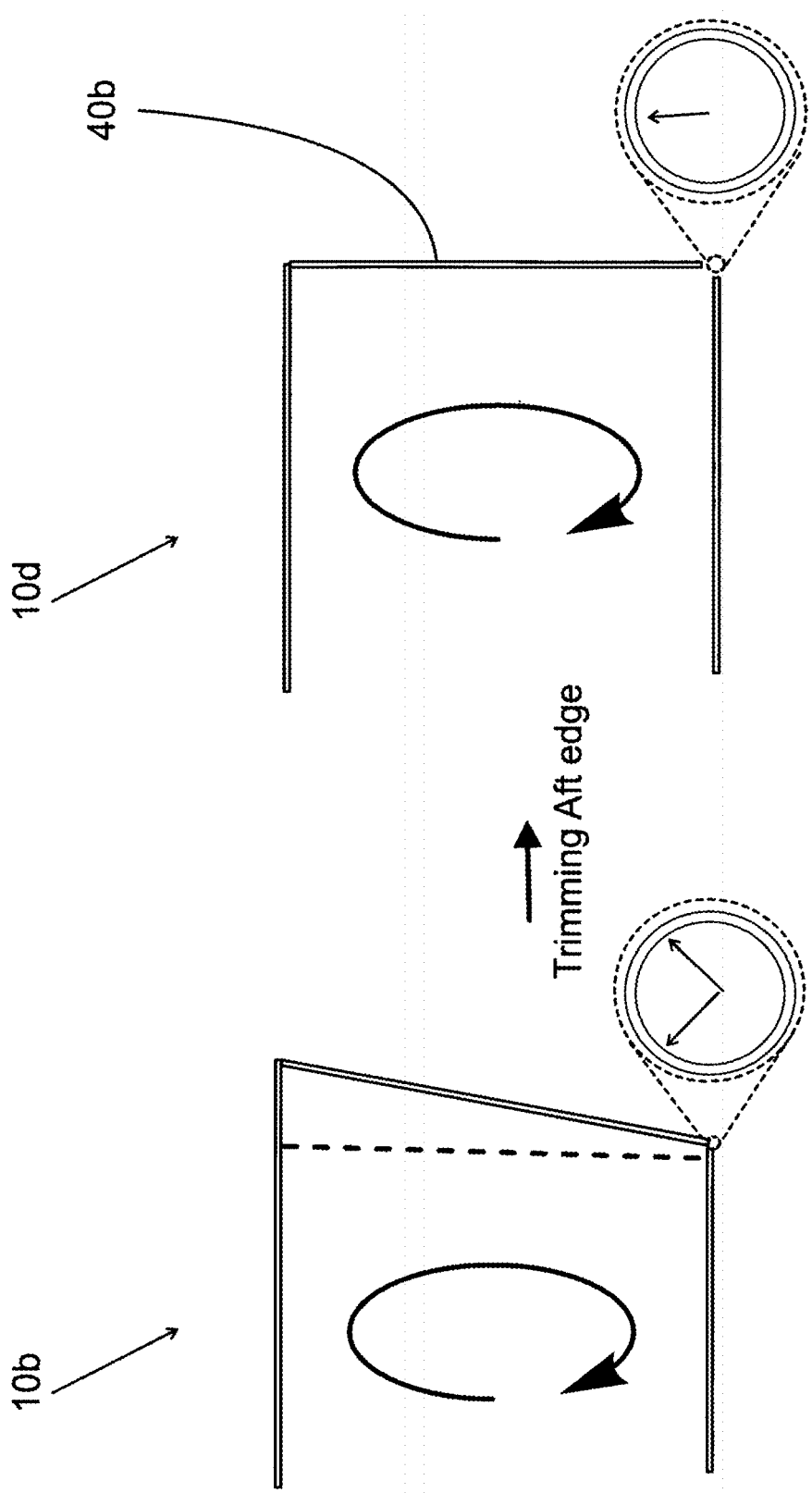

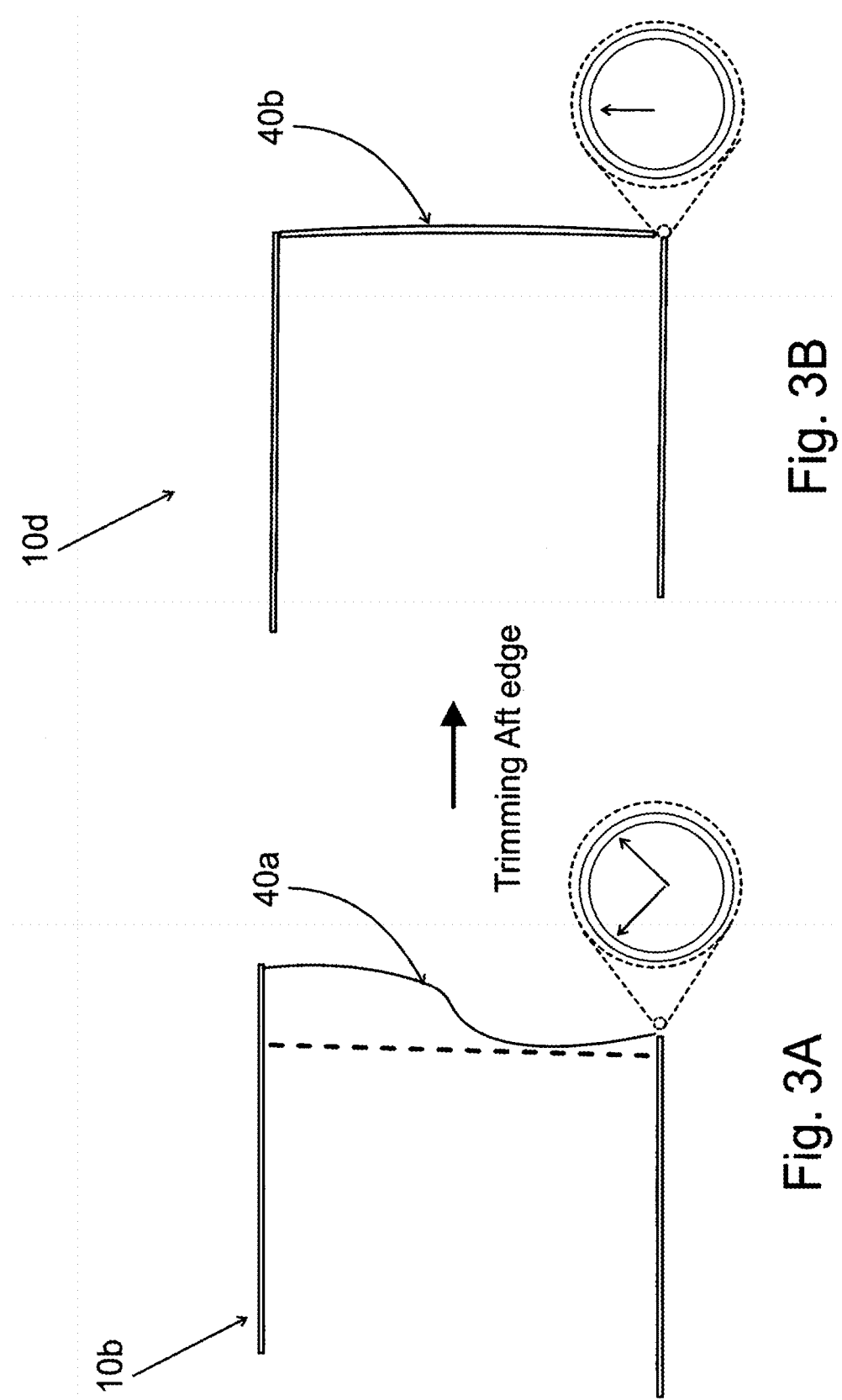

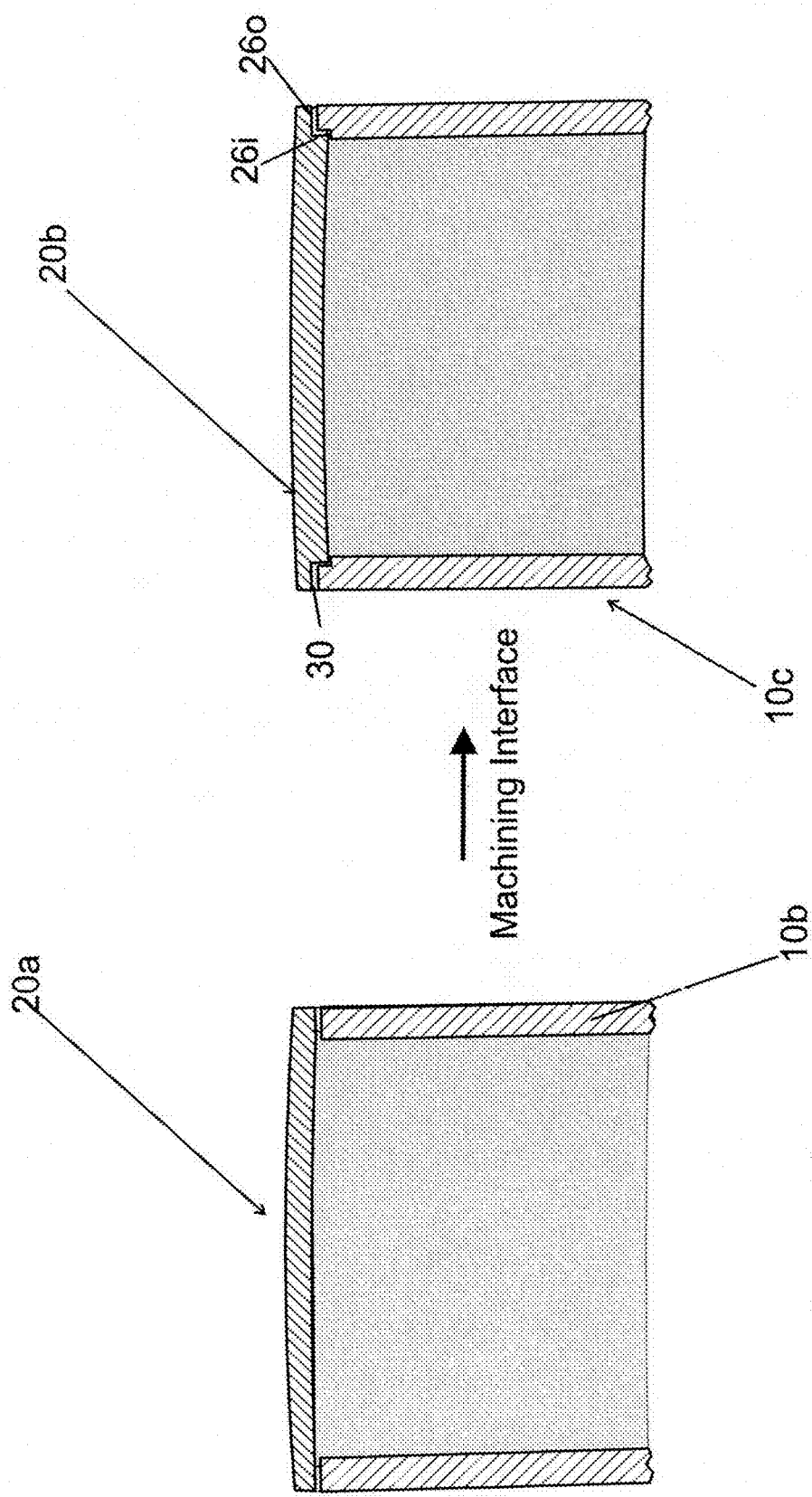

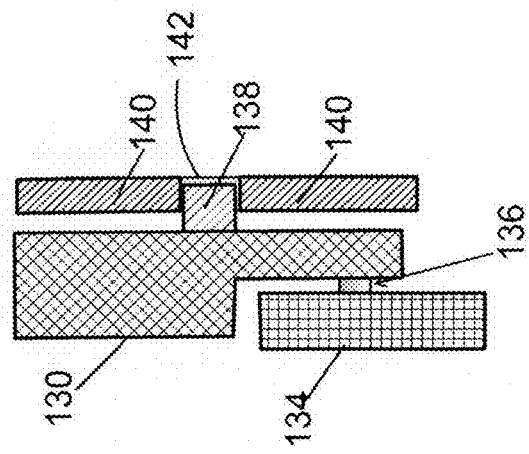
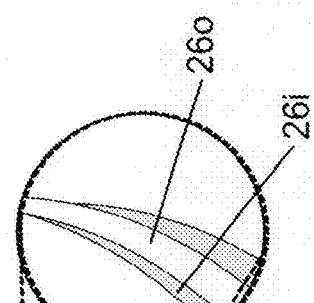
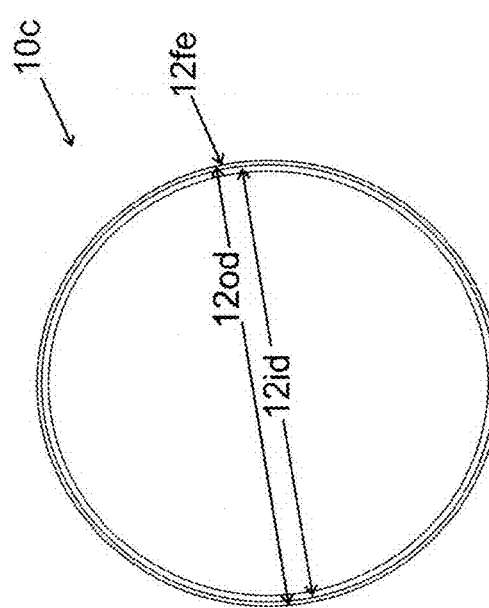
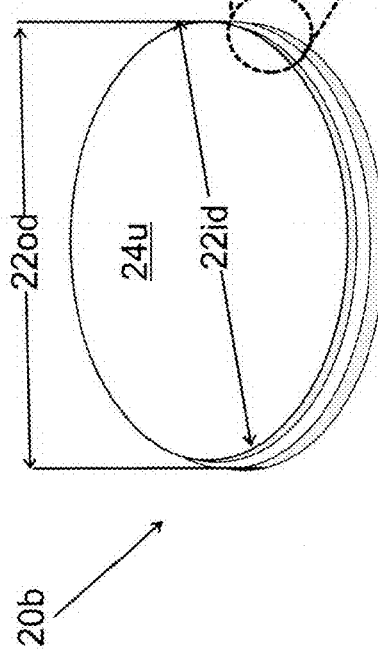

heat-treating the tube within a close-fitting cylindrical steel rounding-fixture, wherein the heat-treating is provided at several degrees above the glass transition temperature and over a period of several days to minimize cross-sectional ellipticity, followed by cooling the tube to several degrees below the glass transition temperature, therein freezing-in cylindricity;

↓ affixing a conformal lathe steady-rest, the conformal lathe steady-rest includes a steady-rest with a counter bored center hole and a plurality of radial struts extending inward and radially through radially-oriented slots in a body proper of the steady-rest, wherein each radial strut can move radially inward or outward, a conformal scroll plate positioned coaxially aligned to the counter bored center hole of the steady-rest, wherein said conformal scroll plate has a center opening for the tube and a plurality of circumferentially spaced cam-slots, wherein each of the cam-slots have an intersecting slidable pin that is perpendicularly affixed to a radial strut;

↓ rotating the scroll plate, causing all rollers to move radially inward as determine by the intersecting slidable pins in the plurality of circumferentially spaced cam-slots, wherein the rollers are positioned circumferentially about equidistantly around the conformal scroll plate, and there are enough rollers to support the tube therein maintaining cylindricity and providing equal and opposing support for the thin-wall of the tube as it is machined;

↓ equipping an end of the tube with a stiffening outer sleeve as needed, wherein the stiffening outer sleeve is a close-fitting cylindrical steel axial cup to prevent damage to the tube when fastened in the jaws of the lathe chuck;

↓

FIG. 10A mounting the tube in the close-fitting cylindrical steel axial cup and extended through the conformal lathe steady-rest;

commencing lathe headstock rotation of the tube and gradually increasing speed, therein causing the each of the rollers to come into contact an outer surface of the tube, therein causing all the rollers to rotate, wherein said contact imparts force against the thin-wall of the tube resulting in cylindricity of the tube while in rotation in the conformal lathe steady-rest;

positioning a cutting tool on an inside edge of a forward end wall of the tube at a point fully supported by one of the rollers in contact with an opposing position on the outer surface of the tube;

using the cutting tool to incrementally cut away, as needed, a fractional thickness of the forward end wall of the tube, so that the wall thickness is uniform and known, therein creating a mating surface for forming a labyrinth-joint closure when a machined tube is adhered to a circular planar element that has been trimmed to partially fit inside and capped onto the mating surface of the forward end wall of the machined tube; and

→ reversing the machined tube in the lathe and trimming an aft end wall, squaring it off so that the aft end wall of the machined tube is cylindrical and planar, wherein it has an aft O-ring sealing surface.

METHOD FOR PRECISE CONTROL OF MANUFACTURE OF NON-RIGID THIN-WALLED TUBE PRODUCTS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The invention relates generally to imparting a conformation to and a machining of thin-walled tubular elements, and in particular to a method for correcting non-rigid thin-walled tubular elements having geometric deficiencies, wherein, following correction, the tubular element can be used as a beaker for a propellant, for example that is a cartridge for a rocket motor.

2. Background

Solid rocket propellants are typically cast in a rocket's motor chamber or cast in a metal beaker forming a cartridge that can be positioned in the rocket motor's chamber. An advantage of the cartridge is that as the propellant ages, the propellant can be refreshed by replacing an old cartridge with a new cartridge.

The advantage of using a metal beaker is that it can be machined to exact specifications. Metal beakers are also known to distort, for example during welding.

Beakers composed of a polymeric material potentially could be preferable as they should be lighter than a metal beaker, assuming the beakers have a comparable wall thicknesses. A disadvantage to polymeric materials is that they are very difficult to machine, and, while some polymers can be extruded to exact dimensions, polymers having high glass transition temperatures are needed for performance characteristics, and a formed product frequently has internal stresses produced by the extrusion process, and these internal stresses are manifest as distortions, where a distortion relieves an internal stress. Examples of distortions of a tubular element include ellipticity from cylindricity, skewing, and non-uniform wall thicknesses. Asperities can sometimes also be present, which are essentially small lumps. A planar element can also be distorted, for example by twisting or cupping.

The enumerated distortions can lead to gas leaks, weak joints, and if severe enough—for example an elliptical cartridge, then it won't even fit in the motor of the rocket.

SUMMARY OF THE INVENTION

The invention is a method for correcting non-rigid thin-walled tubular elements and mating thin-walled closure elements having geometric deficiencies, wherein, following correction, a tubular element with a joined closure element may be used as a leak-free beaker filled with cast, cured propellant forming a cartridge for a rocket motor. Applications include an airplane fitted with rocket motor boosters, where the boosters facilitate take-off and landing on short runways that otherwise would not be possible.

A first object of the invention is to correct thin-walled tubular elements and mating thin-walled closure elements to have precisely-controlled, precisely-dimensioned geometric features using machine-tool practices.

A second object of the invention is to process the tubular elements and mating elements employing precision manufacture and an invented machine tool for machining non-rigid thin-walled tubular elements.

A third object of the invention is that assembly of the tubular elements and mating closure elements is sufficient that randomly-selected mating components is feasible, practicable, and closure is leak-free.

A fourth object of the invention is that the fabrication of interfacial-joints imparts reliability and safety, wherein fabricated applications are leakage-free and hot-gas-resistant.

BRIEF DESCRIPTION OF THE DRAWINGS

The foregoing invention will become readily apparent by referring to the following detailed description and the appended drawings in which:

FIG. 1A (also referred herein as FIG. 1a) is an end-on schematic view of the thin-walled tubular element illustrating the "as received" ellipticity;

FIG. 1B (also referred herein as FIG. 1b) is an end-on schematic view of the thin-walled tubular element illustrating the required cylindricity;

FIG. 2A (also referred herein as FIG. 2a) is a side schematic view of the thin-walled tubular element illustrating that "as received" it is skewed;

FIG. 2B (also referred herein as FIG. 2b) is a side schematic view of the thin-walled tubular element illustrating the needed orthogonality required for forming a precise, leak-proof end-closure seal;

FIG. 3A (also referred herein as FIG. 3a) is a side schematic view of the thin-walled tubular element illustrating an aft O-ring sealing surface that is non-planar;

FIG. 3B (also referred herein as FIG. 3b) is a side schematic view of the thin-walled tubular element illustrating the aft end of the tubular element that has been machined, trimming the aft end so that it now planar, which is a suitable aft O-ring sealing surface;

FIG. 6A (also referred herein as 6a) is a cross-sectional partial view of a thin-walled tubular element joined with a forward closure element, wherein it has an overlapping joint, that was determined to be subject to failure;

FIG. 6B (also referred herein as 6b) is a cross-sectional partial view of a thin-walled tubular element joined with an undercut forward closure element, wherein the joint is an interfacial "labyrinth" joint, that requires machining, but is a much stronger joint;

FIG. 7 is a forward end view 10fe illustrating the outside diameter 10od and the inside diameter 10id of the thin-walled tubular element 10, wherein the inside diameter, following machining, has an inside diameter 10id that is uniform at the interface of the thin-walled tubular element 10 with an undercut portion of the forward closure element 12;

FIG. 8A (also referred herein as FIG. 8) is a perspective view of the forward closure element 12 that following machining it has an undercut portion 12u with a uniform inside diameter 12id that, that at the interface, is slightly smaller than the inside diameter 10id of the thin-walled tubular element 10, and a forward closure outside diameter 12od that is about the same length as the outside diameter 10od of thin-walled tubular element 10, therein creating an overlap;

FIG. 8B (also referred herein as FIG. 8a) is an exploded view of the forward closure element 12 illustrating the interface surface 26i and the overlap surface 26O of the forward closure element.

FIG. 9 is a cross-sectional view taken along sectional line 9-9 in FIG. 5 illustrating a portion of a strut 130, an axial 136, a roller 134, a slidable pin 138, a cam-slot 142, and a scroll plate 140;

FIG. 10A (also referred herein as FIG. 10a) and FIG. 10B (also referred herein as FIG. 10b) contains a recitation of the method for correcting non-rigid thin-walled tubular elements having geometric deficiencies.

DETAILED DESCRIPTION OF THE INVENTION

Figure 4:
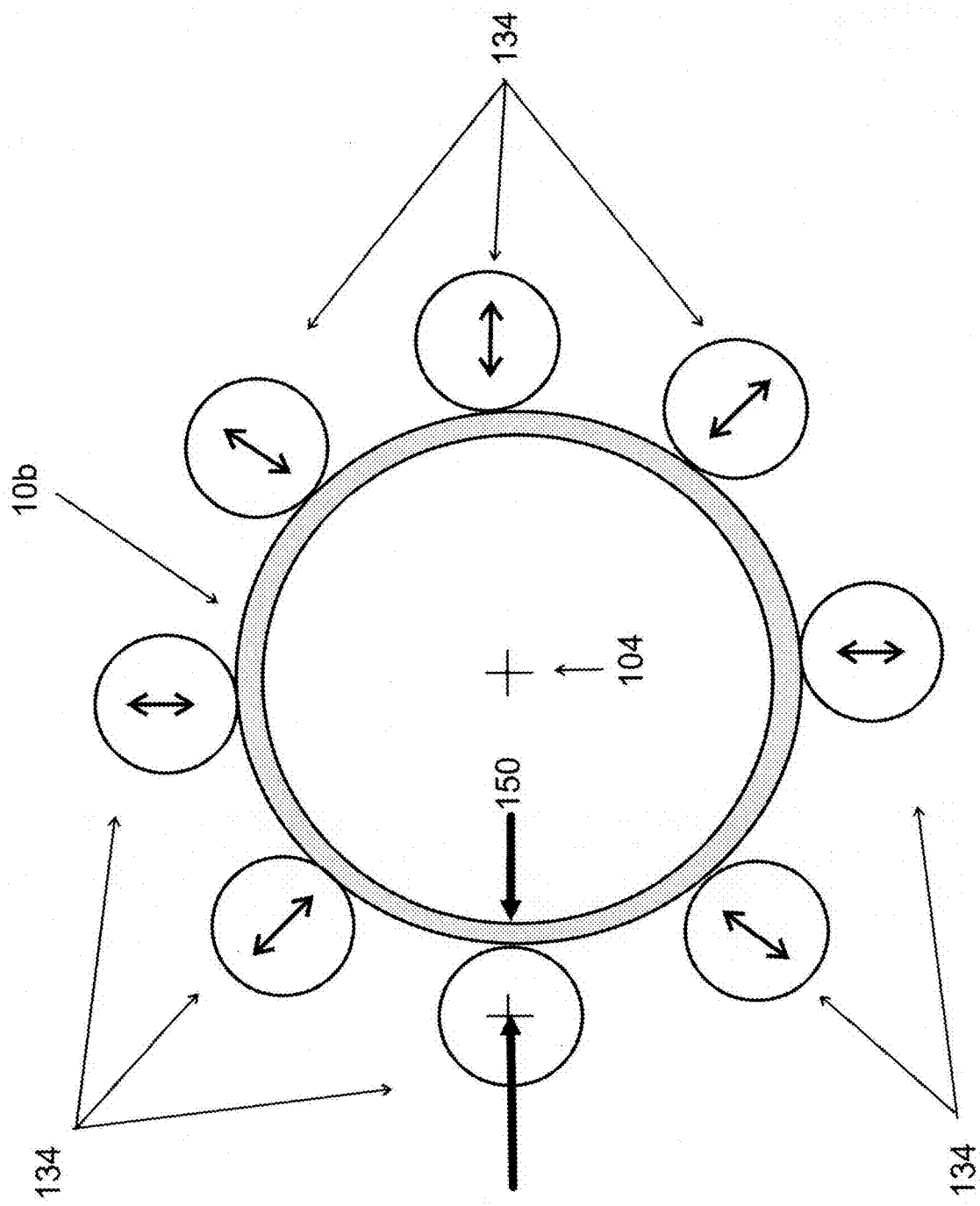
FIG. 4 is a frontal schematic view of a conformal lathe steady-rest, wherein cylindricity and stiffness are imposed by many precisely-contacting cylindrical rollers.

The invention is a method for correcting non-rigid thin-walled tubular elements and mating thin-walled planar closure elements having geometric deficiencies, wherein, following correction, a tubular element (tube) with a joined closure element may be used as a leak-free beaker filled with cast, cured propellant and forming a cartridge. The method is required to remove asperities, maximize cylindricity, squaring a forward end sidewall and a rearward end sidewall, so that the forward end side wall of the tubular element can be fitted, bonded and sealed to a circular planar element using an interfacial joint, and more particularly, closure with a labyrinth-joint. The method provides uniformity so that that both the tubular element and the circular planar element are interchangeably uniform in size, shape and performance, and can be readily assembled into a non-rigid thin-walled beaker.

The method includes the steps of:

heat-treating the tube within a close-fitting cylindrical steel rounding-fixture, wherein the heat-treating is provided at several degrees above the glass transition temperature of the principle material of the tube and over a period of several days to minimize cross-sectional ellipticity, followed by cooling the tube to several degrees below the glass transition temperature, which freezes-in cylindricity;

affixing a conformal lathe steady-rest, the conformal lathe steady-rest includes a steady-rest with a counter bored center hole and a plurality of radial struts extending inward and radially through radially-oriented slots in a body proper of the steady-rest, wherein each radial strut can move radially inward or outward, a conformal scroll plate positioned coaxially aligned to the counter bored center hole of the steady-rest, wherein said conformal scroll plate has a center opening for the tube and a plurality of circumferentially spaced cam-slots, wherein each of the cam-slots have an intersecting slidable pin that is perpendicularly affixed to a radial strut;

rotating the scroll plate, causing all rollers to move (for example, simultaneously) radially inward as determined by the intersecting slidable pins in the plurality of circumferentially spaced cam-slots, wherein the rollers are positioned circumferentially about equidistantly around the conformal scroll plate, and there are enough rollers to support the tube therein maintaining cylindricity and providing equal and opposing support for the thin-wall of the tube as it is machined;

equipping an end of the tube with a stiffening outer sleeve as needed, wherein the stiffening outer sleeve is a close-fitting cylindrical metallic, such as, steel, or nonmetallic axial cup or sleeve to prevent damage to the tube when fastened in the jaws of the lathe chuck;

mounting the tube in the close-fitting cylindrical steel axial cup and through the conformal lathe steady-rest;

commencing lathe headstock rotation of the tube and gradually increasing speed, therein ultimately causing each of the rollers to come into contact with an outer surface of said tube, therein causing all the rollers to roll, wherein the contact imparts force against the thin-wall of the tube resulting in cylindricity of the tube as it is turning in the conformal lathe steady-rest;

positioning a cutting tool on an inside edge of a forward end wall of the tube at a point fully supported by at least one of the rollers in contact with an opposing position on the outer surface of the tube, using the cutting tool to incrementally cut away, as needed, a fractional thickness of the forward end wall of said tube, so that the wall has a uniform thickness, and therefore a uniform inside cylindrical diameter; therein creating a mating interface surface for forming a labyrinth-joint when the tube is adhered to a machined circular planar closure element, wherein the machined circular planar closure element is a disk having an outer diameter that is about equal to the outside diameter of the tube, and having an inner concentric smaller diameter that is only slightly smaller than the uniform inside diameter of the tube; and reversing the tube in the lathe and trimming an aft end wall, squaring it off so that the aft end wall of the tube is cylindrical and planar, that is an aft O-ring sealing surface.

The method further includes the step of checking the inside diameter of the fractional thickness of the forward end wall of the tube for acceptability using precisely-dimensioned rigid "Go" and "No-Go" plug-gauges.

The method further includes the step of checking that the outer diameter of the circular planar closure is about equal to the outside diameter of the tube, and that the inner concentric smaller diameter is only slightly smaller than the uniform inside diameter of the tube for acceptability using precisely-dimensioned rigid "Go" and "No-Go" plug-gauges.

The method further includes the step of interchanging a plurality of circular planar closures for fit with the inside diameter of the fractional thickness of the forward end wall of with at least one of the tubes.

The method further includes the step of interchanging a plurality of forward end walls of said tubes for fit with at least one circular planar closure.

The method further includes the steps of adhering a checked circular planar closure to a checked forward end wall of the tube, therein forming a beaker; filling the beaker with propellant while it is in the close-fitting cylindrical steel rounding-fixture; therein forming a filled cartridge; and confirming that the filled cartridge fits into a desired rocket motor, and is seated against the O-ring, therein forming a flush O-ring seal.

The method further includes the step of testing the rocket motor.

In one embodiment, the invention is a cartridge filled with a rocket propellant, wherein the filled cartridge is a non-rigid thin-walled a cylindrical tubular element (tube), wherein the tube has a length of about 20 inches with a nominal diameter of about 9.73 inches±about 0.218 inches, wherein the tube is composed of a wall of a modified polyphenylene oxide that is insulated with an admixture of para-phenylene terephthalamide (Kevlar® is a trademark of DuPont) fibers in a cured rubber, wherein the tube has been heat-treated within a close-fitting cylindrical steel rounding-fixture to assure cylindricity.

An interior fraction of a forward end of the wall of the tube has been trimmed, as needed, therein providing a uniform inside diameter and cylindricality; and an aft end of the wall of the tube has been trimmed to achieve orthogonality, for forming a flush O-ring seal.

The modified polyphenylene oxide is available as Noryl® EN-265, which was a General Electric trademark. The modified polyphenylene oxide may contain additives, like polystyrene, which tend to lower the glass transition temperature.

The para-phenylene terephthalamide fibers are admixed with a curable rubber, wherein the rubber, in an exemplary embodiment, is EPDM. EPDM is the abbreviation for ethylene propylene diene-monomer.

In FIG. 1a, the thin-walled tubular element 10 "as received" is generally elliptical, wherein the outside diameter 9 varies with direction, and often has a wall thickness that is variable, either thin in some regions 5 or thick at other regions 3, wherein thickness is defined as the distance between the outside surface 7 minus the inside surface 8. In a first step an elliptical tube 10 is heat treated, therein freezing in cylindricity forming a more cylindrical tube 10b. If perfectly cylindrical the outside diameter 9 does not vary with direction, and therefore has a uniform outside diameter. However, a variation in wall thickness will cause the tube 10b to have an asymmetrical inside diameter. The asymmetry makes it very difficult to form a forward closure having an interfacial-joint, because the forward closure either won't fit inside without distorting the forward closure; or the interfacial-joint will have a gap and/or form a poor bond that is a weak joint that shears easily.

The invented method addresses the thickness issue by machining/abrading a forward end of the cylindrical tube 10b to correct for the variable inside diameter. As shown in FIG. 7, now-machined tube 10c has an inside diameter 12id and an outside diameter 12od that are uniform and known. Likewise, the circular planar closure element 20b, as shown in FIG. 8a and FIG. 8b, is now undercut to have a smaller concentric disk portion 24u that is contiguous with the machined circular planar closure element 20b, wherein the smaller concentric disk portion 24u has an inside (or minor) diameter 22id. The inside diameter 22id is suitable for forming an interfacial-joint inside the machined end of the tube 10c, which has a slightly larger inside diameter 12id. Taken together, a lap-joint and an interfacial-joint produce a labyrinth-joint. The amount of overlap 26o and the depth of interface 26i are shown in FIG. 8b and in FIG. 6b. The labyrinth-joint, shown in FIG. 6b, is adhered with a curing adhesive 30.

FIG. 2a illustrates a thin-walled tubular element that "as received" was skewed. FIG. 3a has a thin-walled tubular element with an aft O-ring sealing surface that is distorted, non-planar and not sealing. The skewing and the distorted aft wall 40a can both be corrected by first heat treating and then trimming the aft end of the tubular element 40a forming a new aft end of the tubular element 40b, which imparts orthogonal planarity and therefore solving the sealing issue.

Figure 5:
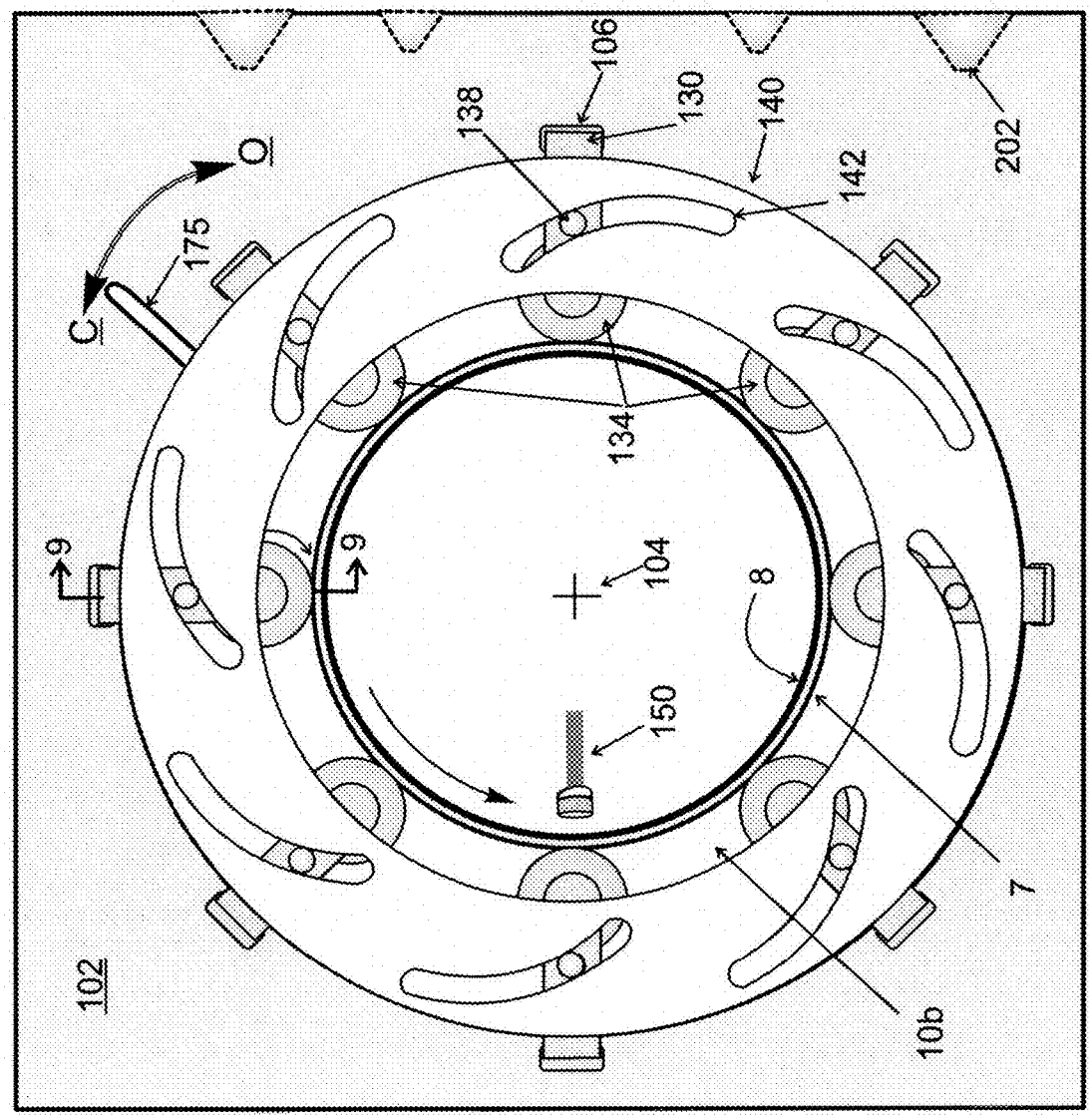
FIG. 5 is a frontal perspective view of the conformal lathe steady-rest.

FIG. 4 is a frontal schematic view of a conformal lathe steady-rest 100, wherein cylindricity and stiffness are imposed by many precisely-contacting rollers. Most of the cylindricity was gained in the heat treating first step. A perspective illustration is shown in FIG. 5, and a partial cross-sectional view taken along sectional line 9-9 in FIG. 5 is also shown in FIG. 9, which illustrates a portion of a strut 130, an axial 136 (see FIG. 9), a roller 134, a slidable pin 138, a cam-slot 142, and a scroll plate 140.

The conformal lathe steady-rest 100 is rigidly mounted/fastened on the ways 202 of the lathe. As mounted/fastened, the conformal lathe steady-rest 100 is aligned such that when the rollers 134 are closed upon and just contacting the tube 10b, such as to constrain the outside of the tube 10 to have a cylindrical surface 108, wherein a longitudinal centerline 104 (as shown in FIGS. 4 and 5) of the tube held within the conformal lathe steady-rest 100 is coincident with the longitudinal centerline 104 of the lathe headstock spindle (not shown). Note that via the scroll-plate 140 in FIG. 5, all the rollers 134 can be simultaneously, smoothly and equally be displaced solely in the radial direction (i.e.; perpendicular to the cylindrical outer surface 7 of the tube 10b).

Within a body of the steady-rest 102 and extending outward from a counter bored center hole (e. g.; in even-spacings) are radially-oriented slots 106 in the housing of the steady rest. Each of the radially-oriented slots 106 are precisely formed and dimensioned to accommodate a radially moving strut 130. A roller 134, via an axle 136 as shown in FIG. 9, is attached to each strut 130. Each strut is fitted to a matching radially-oriented slot 106 of the steady-rest. Each strut has a slidable pin, which engages one of several cam-slots in the scroll-plate. The scroll-plate is circular and is installed within a counter-bore in the steady-rest.

Any of various arrangements selected from the group consisting of gears, levers, worm-screws may be implemented to conveniently revolve the scroll-plate. A lever 175 is shown in FIG. 5. as previously stated adjusting the scroll-plate 140 therein positions the rollers 134 as needed. Once all rollers contact the outer surface 7 of the tube 10b the rollers begin to revolve because the surface 7 is moving, and the contact causes the rollers to roll.

The steps of the method for correcting non-rigid thin-walled tubular elements having geometric deficiencies start in FIG. 10a and continue to completion in FIG. 10b.

Figure 11:
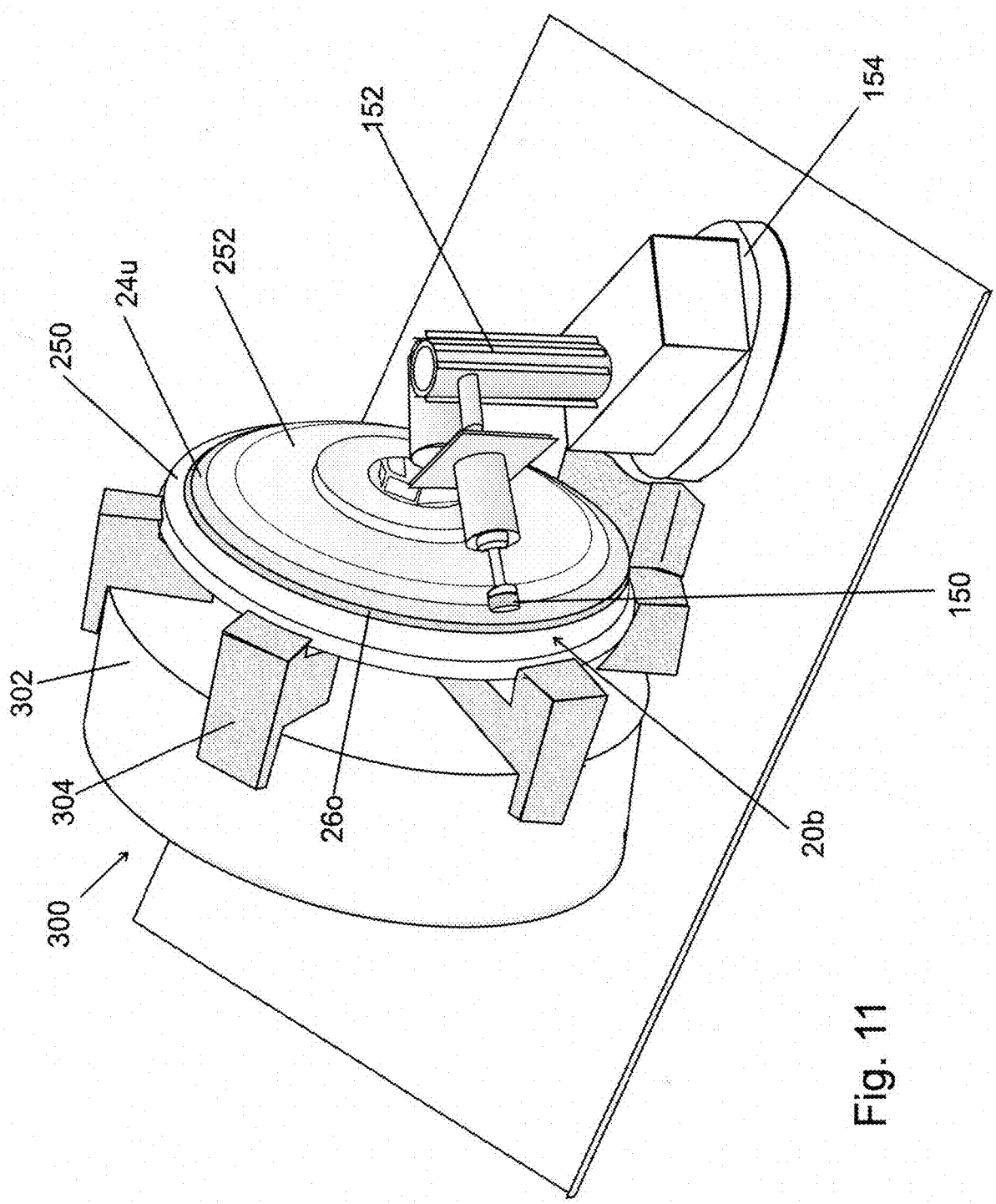
FIG. 11 a perspective illustration of the forward closure element being machined to be suitable for forming a labyrinth-joint.

The apparatus for machining the forward closure element 20b is illustrated in FIG. 11, to form a labyrinth-joint portion in the forward closure element 20b. The apparatus of FIG. 11 includes a spindle 300 having a chuck 302 with jaws 304, three are visible. The jaws are rigidly holding a metal base plate 250. The base plate has a diameter and thickness that is greater than the forward closure element 20b. The forward closure element 20b is sandwiched between the metal base plate 250 and a smaller cover plate 250, such that a perimeter portion of the underside 24u of 20b can be tooled.

The tool 150 is carbide tipped, and it emanates from the tool post 152 that is supported by a compound rest 154.

The forward closure element 20 as received is not always flat. If it is not then it can be heat treated freezing in flatness 20b. After tooling, as shown in FIG. 8b, the flat forward closure element 20b has an overlap 26o with an outside diameter 22od. The grinding (cutting) tool 150 undercuts 20b to create the interface 26i with the overlap 26o. The interface and overlap form the forward closure element's portion of the labyrinth joint.

The forward closure element is sometimes received as a square or a rectangular sheet, and correction includes cutting out a disk that becomes the forward closure element out of the sheet. This can be accomplished using known methodology.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method for correcting a non-rigid thin-walled tubular element (tube) of a polymeric material, where said tube has a diameter and a length, where said tube has finite geometric deficiencies and asperities, comprising:

heat-treating said tube within a close-fitting cylindrical steel rounding-fixture, wherein the heat-treating is provided at several degrees above the glass transition temperature of the principle material of said tube and over a period of several days to minimize cross-sectional ellipticity, followed by cooling said tube to several degrees below the glass transition temperature, which freezes-in cylindricity;

affixing a conformal lathe steady-rest, the conformal lathe steady-rest includes a steady-rest with a counter bored center hole and a plurality of radial struts extending inward and radially through radially-oriented slots in a body proper of the steady-rest, wherein each radial strut can move radially inward or outward, a conformal scroll plate positioned coaxially aligned to the counter bored center hole of the steady-rest, wherein said conformal scroll plate has a center opening for the tube and a plurality of circumferentially spaced cam-slots, wherein each of the cam-slots have an intersecting slidable pin that is perpendicularly affixed to a radial strut;

rotating the scroll plate, causing all rollers to move radially inward as determine by the intersecting slidable pins in the plurality of circumferentially spaced cam-slots, wherein the rollers are positioned circumferentially about equidistantly around the conformal scroll plate, and there are enough rollers to support the tube therein maintaining cylindricity and providing equal and opposing support for the thin-wall of the tube as it is machined;

equipping an end of said tube with a stiffening outer sleeve as needed, wherein the stiffening outer sleeve is a close-fitting cylindrical steel axial cup to prevent damage to said tube when fastened in the jaws of the lathe chuck;

mounting said tube in the close-fitting cylindrical steel axial cup and through the conformal lathe steady-rest;

commencing lathe headstock rotation of said tube and gradually increasing speed, therein ultimately causing each of the rollers to come into contact with an outer surface of said tube, therein causing all the rollers to roll, wherein the contact imparts force against the thin-wall of said tube resulting in cylindricity of said tube while it is being turned in the conformal lathe steady-rest;

positioning a cutting tool on an inside edge of a forward end wall of said tube at a point fully supported by at least one of the rollers in contact with an opposing position on the outer surface of said tube, using the cutting tool to cut, incrementally, as needed, a fractional thickness of the forward end wall of said tube, so that the wall has a uniform thickness, and therefore a uniform inside diameter; therein creating a mating interface surface for forming a labyrinth-joint when said tube is adhesively joined to a machined circular planar closure element, wherein the machined circular planar closure element is a disk having an outer diameter that is about equal to the outside diameter of said tube, and having an inner concentric smaller diameter that is only slightly smaller than the uniform inside diameter of said tube; and reversing said tube in the lathe and trimming an aft end wall, squaring it off so that the aft end wall of said tube is cylindrical and planar, wherein it has an aft O-ring sealing surface.

2. The method according to claim 1, wherein said tube initially is elliptical, and wherein said tube is about 20 inches long and has a nominal diameter of about 9.73 inches±about 0.218 inches.

3. The method according to claim 1, wherein said tube initially has a variable wall thickness ranging from about 0.178 inches to about 0.218 inches.

4. The method according to claim 1, wherein the cutting tool is carbide tipped.

5. The method according to claim 1, wherein the principle material of said tube is polyphenylene oxide, and wherein the glass transition temperature is 215° C.

6. The method according to claim 1, further comprising the step checking the inside diameter of the fractional thickness of the forward end wall of said tube for acceptability using precisely-dimensioned rigid "Go" and "No-Go" plug-gauges.

7. The method according to claim 1, further comprising checking that the outer diameter of the circular planar closure using is about equal to the outside diameter of said tube, and that the inner concentric smaller diameter is only slightly smaller than the uniform inside diameter of said tube for acceptability using precisely-dimensioned rigid "Go" and "No-Go" plug-gauges.

8. The method according to claim 1, further comprising interchanging a plurality of circular planar closures for fit with the inside diameter of the fractional thickness of the forward end wall of with at least one said tube.

9. The method according to claim 1, further comprising interchanging a plurality of forward end walls of said tubes for fit with at least one circular planar closure.

10. The method according to claim 1, further comprising adhering a checked circular planar closure to a checked forward end wall of said tube, therein forming a beaker;

filling the beaker with propellant while the beaker is in the close-fitting cylindrical steel rounding-fixture, therein forming a filled cartridge; and confirming that the filled cartridge fits into a desired rocket motor, and is seated against the O-ring, therein forming a flush O-ring seal.

11. The method according to claim 1, further comprising loading the filled cartridge in a rocket motor chamber; and testing the rocket motor.

* * * * *